(No Model.) 4 Sheets—Sheet 1.

J. GUY.
WATER CLOSET.

No. 408,836. Patented Aug. 13, 1889.

WITNESSES:
W. H. Geers.
A. Sedgwick

INVENTOR:
J. Guy
BY Munn & Co.
ATTORNEYS.

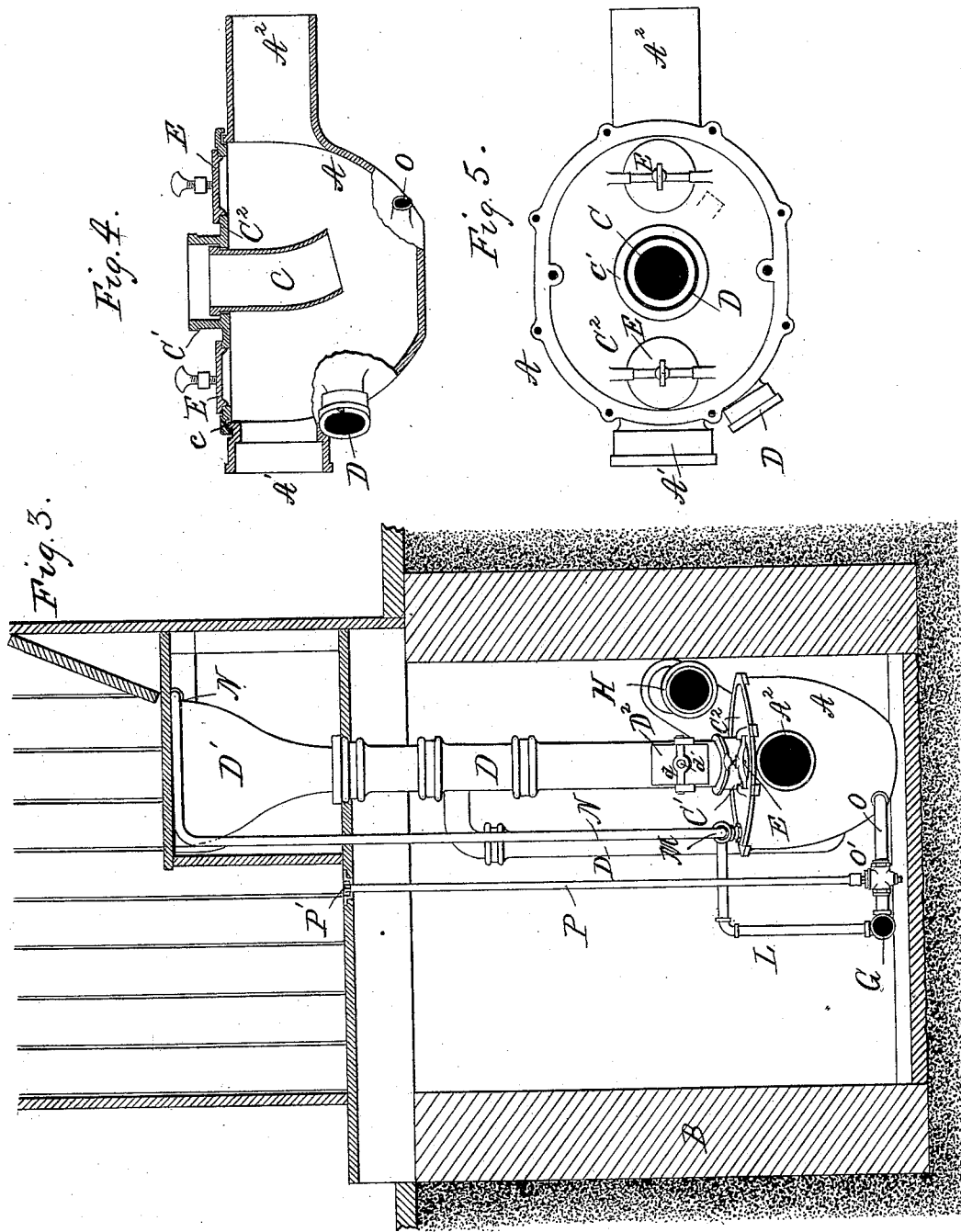

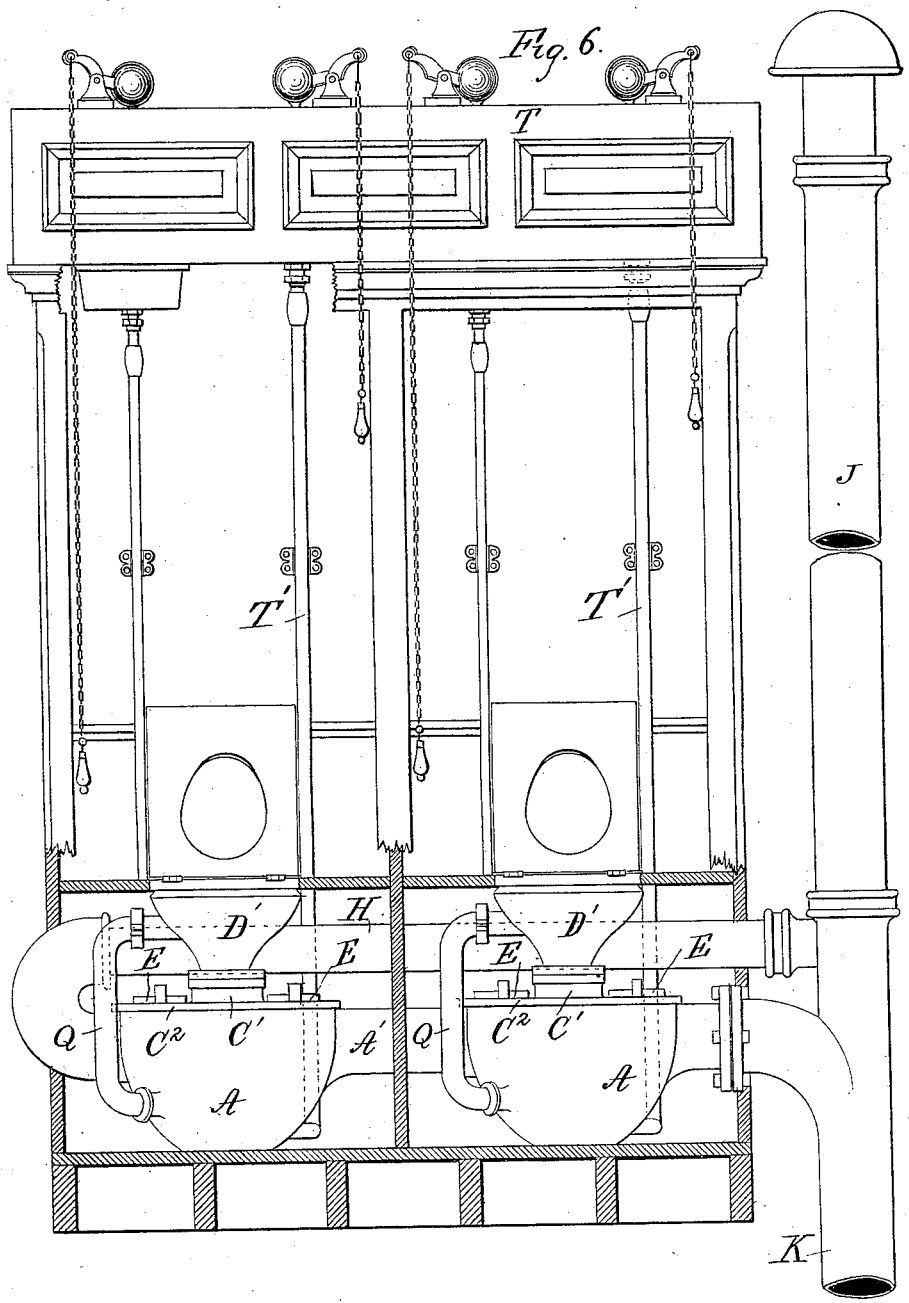

(No Model.) 4 Sheets—Sheet 4.

J. GUY.
WATER CLOSET.

No. 408,836. Patented Aug. 13, 1889.

WITNESSES:
W. H. Geers
C. Sedgwick

INVENTOR:
J. Guy
BY Munn & Co
ATTORNEYS.

UNITED STATES PATENT OFFICE.

JOSEPH GUY, OF NEW YORK, N. Y.

WATER-CLOSET.

SPECIFICATION forming part of Letters Patent No. 408,836, dated August 13, 1889.

Application filed June 2, 1887. Renewed July 16, 1889. Serial No. 317,649. (No model.)

*To all whom it may concern:*

Be it known that I, JOSEPH GUY, of the city, county, and State of New York, have invented new and useful Improvements in Water-Closets, of which the following is a full, clear, and exact description.

My invention relates to improvements in water-closets and their accessories applicable to tenement-houses, public institutions, offices, residences, &c., whereby absolute sanative results and immunity from derangements are secured.

Reference is to be had to the accompanying drawings, forming a part of this specification, in which similar letters of reference indicate corresponding parts in all the figures.

Figure 1:
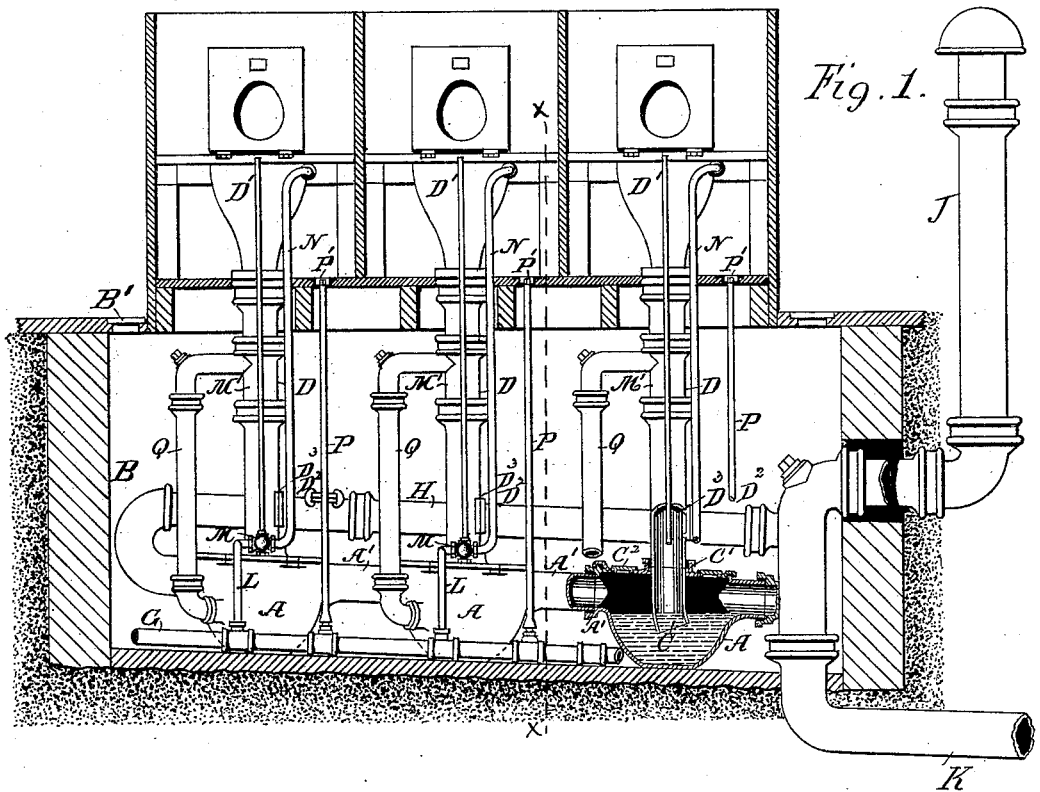
Figure 2:
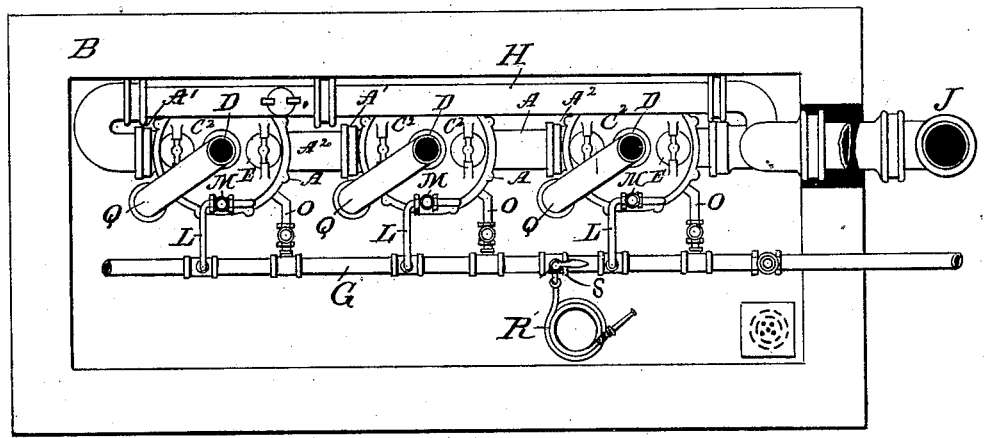
Figure 8:
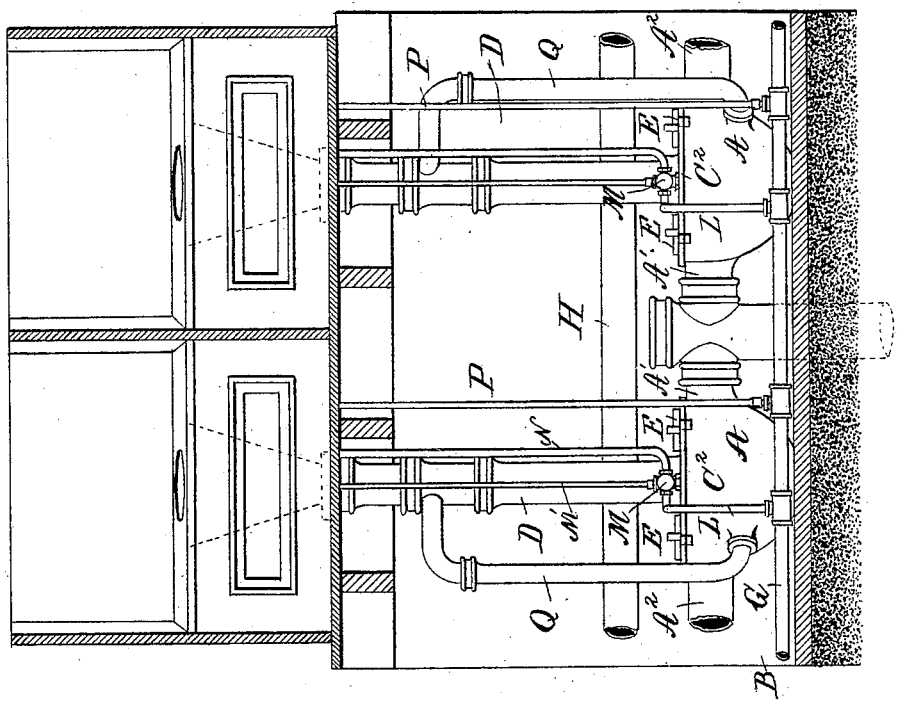
Figure 7:
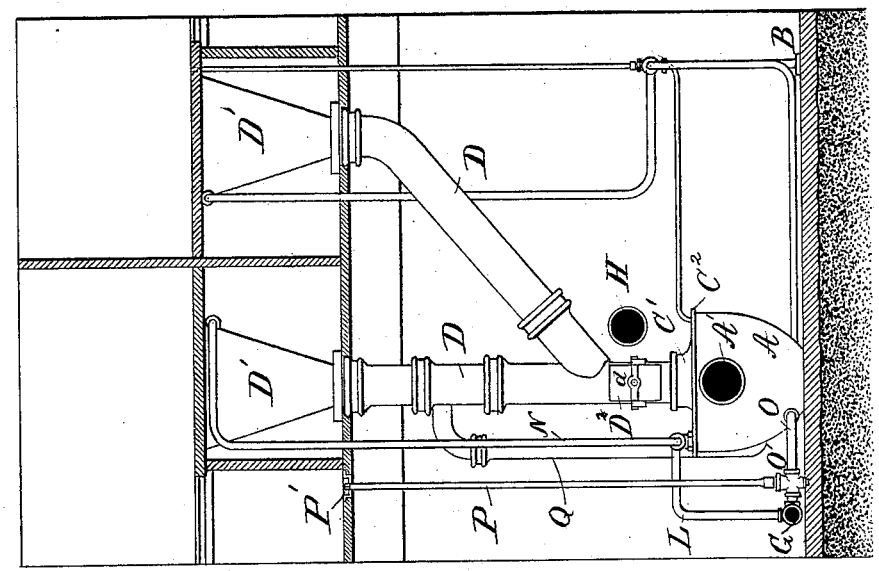

Figure 1 is a front elevation of three closets arranged continuously and constructed in accordance with my invention. Fig. 2 is a top view of the apparatus below the hoppers. Fig. 3 is a vertical cross-section on line $x\,x$ of Fig. 1. Fig. 4 is an enlarged vertical section and side view of the receiver or trap. Fig. 5 is a plan view of the same. Fig. 6 is a sectional elevation showing the adaptation of my apparatus to offices, residences, &c., the hoppers and traps in such applications being of earthenware and the water-supply derived from a cistern, the flush to hopper and trap being operated by chains and pulls in the usual way, and the chain to the trap-flush valve being shown short, and so removed out of the ordinary reach of the occupant of the closet. Fig. 7 is a sectional elevation showing an arrangement by which one trap receives the contents of two hoppers, and Fig. 8 is a similar view showing water-closets set on either side of the central discharge-pipe.

The principal features of my invention are:

First. The receiver or trap A, made boat-shaped, and the introduction of the water for flushing the trap, by which the contents of the trap are expelled at will and driven to the sewer. The trap is of large capacity, allowing the contents of a number of receivers to float through unobstructed to the sewer.

Second. The hand-holes in soil and air pipes and in the trap, by which all obstructions can be instantaneously removed.

Third. The arrangement of air and vent pipes, by which perfect ventilation of soil pipes and traps is secured.

The more particular description of trap A is as follows: It is cast-iron and very strong and durable, with a hub A' on one end and the plain pipe $A^2$ on the other, so as to make connection with one or more traps, the pipe $A^2$ forming the discharge-outlet. The discharge-outlet is so placed that not less than a depth of six inches of water is at all times in the trap, insuring thorough submersion of the soil. The traps A are set on an inclined plane on the floor of the vault B with a sufficient fall to carry away the contents. An interior pipe C is secured in the socket C' on the cover $C^2$, and reaches at a sufficient depth to insure at least a "seal" of one inch in the water retained in the receiver.

With a view to prevent the paper, soil, &c., from falling in and clogging the trap, the lower end of the pipe C is slightly curved toward the outlet, as shown in Fig. 4. I am aware that straight pipes have been used in this connection, and also that pipes having a bend or elbow at the lower end have also been suggested for a like purpose. Both of these forms, however, are ineffectual for the purpose, as I have ascertained by practical tests. In the straight pipe the balling of the paper, &c., is inevitable. The paper floating on the surface of the water within the trap has a movement therein in a circular path, and as it revolves it gathers to itself more paper and secretions as well, the mass forming a plug, which gradually elongates until it reaches the bottom of the trap, thus stopping the soil-pipe entirely. The same thing takes place when an ordinary elbow—such, for example, as that shown in English Patent No. 3,091 of 1872—is formed at the lower end of the soil-pipe. The under part of the elbow comes under and extends across the longitudinal axis of the pipe, forming a shelf or shoulder, which aids rather than retards the formation of the ball or plug. The same thing is true also if a straight pipe be cut off obliquely instead of square at its lower end. I have found that balling will take place with equal facility in this form of pipe also; but when the discharge end of the pipe is given the shape indicated in the drawings liability to ball or clog is removed. The slope is slight and gradual, and whatever bend there is does not extend inwardly as far as the longitudinal center or axis of the pipe, so that there is no abutment or shelf at the bottom. Whatever slight accumulation of paper, &c., there may be from time to time in the pipe is discharged before any perceptible balling takes place, thus keeping the trap clear and in good order.

The trap is provided with a cover recessed around the outer edge, as shown at $c$ in Fig. 4, to fit the rim of the receiver, and the cavity is to be filled with cement, putty, rubber, or other material, and the cover bolted down, making a perfectly air-tight joint. The socket C' receives also the ordinary soil-pipes D from hoppers D', and also the interior curvilinear pipe C, just described. The cover is further provided with two hand-holes E, with plate-covers secured by bridge-bars and thumb or set screws. These hand-holes are for the extraction of any foreign substances, as bottles or other solid matter dropped through the hopper, and which the flush may not remove.

G represents the water-main; H, the air-pipe; J, the vent-pipe to the roof; K, the soil-pipe leading to the sewer; L, the water-supply pipe from main; M, the hopper-valve operated from the closet-seat through the medium of the hopper valve-rod M'.

N represents the supply-pipe for hopper-flush leading from valve M; O', the stop-cock on the lower flush-pipe O for flushing the trap.

P represents the rod reaching to the floor of closet, and P' the floor-plate to receive key for operating rod P and flush from the floor of the closet.

Q represents the overflow-pipe to trap A.

The vault B, of brick, incloses the pipes, and access is gained by a trap-door in the floor of any of the closets, and is ventilated through an opening B', (shown in Fig. 1;) and R' represents a hose-pipe for washing out the vault, said hose being attached to the stop-cock S, fitted in the supply-pipe from the main.

It will be noted that the flush-pipe O is so placed that the water discharged from it will cut across below the mouth or lower end of the pipe C, the jet thus discharging being deflected upward by the rear wall of the trap, carrying with it the solid matters which it may meet, these matters being thus brought to the surface and caused to pass off through the outlet $A^2$ before they have time to sink again. This feature is of great advantage, particularly in tenement-houses, where the inmates are too apt to make the closets a receptacle for all kinds of refuse, solid and liquid. One large bucketful of solid matter is sufficient in many instances to completely clog the trap; but in such case the powerful flush-jet from pipe O, which cuts across below the mouth of the pipe C, will force its way through and will scatter the heap of solid matter in the trap, driving it out from the trap and reopening the mouth of the soil-pipe. The overflow also is so situated as to aid in bringing about this result. It will also be noted that there is an uninterrupted passage through the trap between its end openings A' $A^2$ above the water seal. This is of advantage whether one or more traps be employed, because by connecting the back opening A' with the ventilating-pipe by a back air-pipe H all noxious odors and sewer-gases are carried off and are not liable to force their way up through the soil-pipes into the closets.

In the construction shown in Fig. 6 the traps are flushed with water from cistern T, entering the trap through flush-pipes T'.

There may be two or more hoppers to one trap, as illustrated in Fig. 7, and by carrying the flush-water for the hopper directly back to the trap with a fall there is no danger of freezing.

In all the soil-pipes D are found hand-holes $D^3$ at a short distance above the trap, these hand-holes being closed by covers $D^2$, bars $d$, and screws $d'$. All of these appliances—viz., the hand-holes E and $D^3$, the flush-pipes O, the overflow-pipes Q, and the peculiarly-formed pipes C—in connection with the traps, are for the purpose of keeping the latter free and in good condition for constant use without requiring the constant attendance and supervision of a plumber. The janitor of the building in which the closets are located can do all that is required in this regard. The function of the parts O, Q, and C has already been explained. The hand-holes E are for the purpose of removing solid articles which may get into the trap-body. The hand-holes $D^3$ are for removing larger or longer articles, such as scrubbing-brushes, sticks, and the like which cannot pass out of the pipes C.

In tenement-houses the closets are used, in many instances, for getting rid of all the dirt and garbage, so that it is a matter of prime importance to so construct the traps and those parts immediately adjacent to the trap-bodies as to admit of their being at once relieved of obstructions without requiring them to be taken apart and without calling in the plumber. This is accomplished by my invention.

Having thus described my invention, what I claim, and desire to secure by Letters Patent, is—

1. The trap-body provided with the inlet soil-pipe C, end openings A' $A^2$, and an uninterrupted passage in the trap-body above the seal between the two openings A' $A^2$, as hereinbefore set forth.

2. The trap-body provided with the inlet soil-pipe C and with end openings A' $A^2$, between which there is an uninterrupted passage above the seal, in combination with the ventilating-pipe and the back air-pipe H, connecting opening A' with the ventilating-pipe, and the sewer-pipe connected to the other opening A², all substantially as hereinbefore set forth.

3. A series of trap-bodies provided each with end openings A' A², through which they communicate and are connected together, and an uninterrupted passage throughout the whole series above the water seal, and soil-pipes for each trap, in combination with a ventilating-pipe communicating with one end of the said passage and a sewer-pipe communicating with the opposite end of said passage, substantially as and for the purposes hereinbefore set forth.

4. The trap-body having end openings A' A² and an uninterrupted passage between said opening above the seal, and the soil-pipe having its lower end within the trap slightly and gradually curved in the direction of the trap-outlet, as described, in combination with the flush-pipe located in the side of the trap-body below the soil-pipe, so that the jet discharged from it shall cut across the trap-body directly beneath the mouth of the soil-pipe, as hereinbefore set forth.

5. The trap-body provided with end openings A' A² and an uninterrupted passage between said openings above the seal, and the soil-pipe having its lower end within the trap slightly and gradually curved in the direction of the trap-outlet, as described, in combination with the flush-pipe and the overflow-pipe, arranged and located with respect to the soil-pipe as hereinbefore set forth.

6. The trap-body provided with end openings and with an uninterrupted passage between said openings above the seal, the soil-pipe entering said trap-body, and the covered hand-holes E D³, the hand-hole D³ being in the soil-pipe outside of and a short distance above the trap, and the hand-holes E being in the top of the trap and opening into the said passage therein, as hereinbefore set forth.

JOSEPH GUY.

Witnesses:
JOHN J. SULLIVAN,
WILLIAM A. GILLEN.